Feb. 6, 1962 W. M. WOODHULL 3,020,351

DIRECTIONAL COUPLING NETWORK

Filed March 20, 1957 2 Sheets-Sheet 1

INVENTOR.
WILLIAM M. WOODHULL

BY [signature]

AGENT

United States Patent Office 3,020,351

Patented Feb. 6, 1962

3,020,351
DIRECTIONAL COUPLING NETWORK

William M. Woodhull, Rochester, N.Y., assignor to General Dynamics Corporation, Rochester, N.Y., a corporation of Delaware Filed Mar. 20, 1957, Ser. No. 647,418
5 Claims. (Cl. 179—15)

My invention relates to alternating current apparatus suitable for use in electrical communication systems and more particularly to networks used in telephone systems for discriminating between incoming and outgoing signals at apparatus which is adapted to transmit and receive alternating current signals.

In telephone apparatus, such as a two-way voice repeater or a subscriber telephone set, a signal source and receiving means are coupled in parallel with each other and the combination is coupled to a two conductor line. This parallel arrangement reduces transmitting and receiving efficiencies. Other apparatus introduced to separate the incoming from the outgoing signals in order to prevent interference between the receiving means and signal source introduces additional losses. Past solutions to the problem have involved the use of such devices as hybrid balancing networks of the type shown in Patent 2,629,783, Hopkins, for interconnecting the transmitter, receiver, and line. Such networks offer several disadvantages including those of being bulky, expensive to manufacture, and have the characteristic that the combined receiving and transmitting efficiencies can never be raised above a theoretically determinable point.

Accordingly, it is an object of my invention to provide a new and improved directional coupling system.

Another object of my invention is to provide a new and improved directional coupling system suitable for use with audio frequency transmission systems.

Another object of my invention is to provide a new and improved directional coupling network useful in connection with such apparatus as two-way voice repeaters or subscriber telephone sets.

Another object of my invention is to provide a new and improved directional coupling network having improved transmission and reception efficiency.

Another object of my invention is to provide a new and improved directional coupling network wherein the transmission and receiving efficiencies are not interrelated.

I accomplish these and other objects in a system including a device for transmitting signals to and receiving signals from a line. To this end, the device includes means for receiving a signals transmitted to the device from the line coupled in parallel with a source of amplitude-modulated alternating current signals to be demodulated and transmitted to the line. Means is provided for coupling the modulated signal source and receiving means to the line. This means includes first means for demodulating the positive half cycles of the modulated carrier and for applying the demodulated signal to the line. In order to prevent demodulated signals from interfering with the receiving means, I provide a balancing network having an impedance substantially equal to the impedance of the line and means including second demodulating means for coupling the balancing network in parallel with the signal source and receiving means. The second demodulating means is effective for demodulating the negative half cycles of the modulated carrier. With this arrangement, equal and opposite demodulated signals from the source are applied to the receiving means and therefore do not affect the receiving means.

For a better understanding of my invention, reference is made in the following description to the drawings attached to and forming a part of the present specification, and in which.

Figure 1:
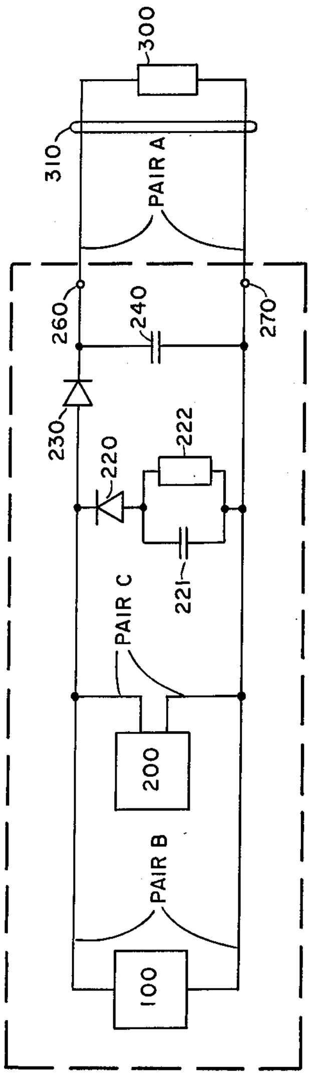
FIG. 1 shows a block form representation of the elements including the subscriber telephone of my invention.
Figure 2:
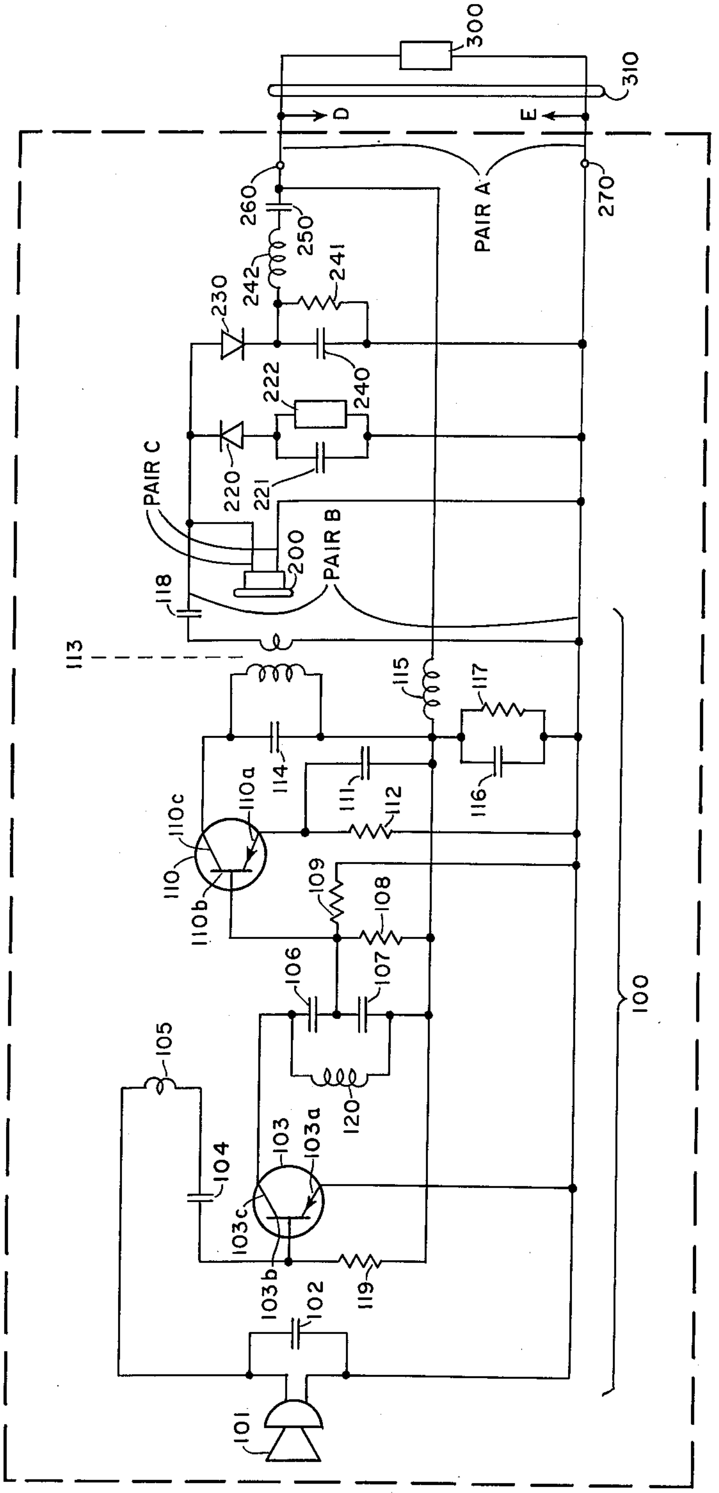
FIG. 2 shows a schematic diagram of the details of the subscriber telephone of FIG. 1; and, FIG. 3 shows another block diagram of a two-way voice frequency repeater.

Referring to FIGS. 1 and 2, the apparatus forming the preferred embodiment of my invention is a telephone set made for transmitting and receiving audio frequency signals over a line such as 310 comprising wire pair A. Line 310 is connected to the telephone at terminals 260 and 270. At the distant end of the line, a power source such as a 48-volt battery (not shown) is connected across the line through high impedance elements (not shown), the latter being effective for impeding passage of alternating current signals through the battery. A source of audio frequency signals and a load, such as a receiver are also connected to the distant end of the line. For purposes of demonstration, the combined impedances of these and all other elements coupling the conductors of pair A and which lie to the right of terminals 260 and 270 are lumped together as element 300. The battery connected to the conductors of pair A is poled so that terminal 260 is maintained at a negative potential with respect to terminal 270.

Within the subscriber telephone, in order to provide a voltage source for certain ones of the elements within the telephone, I have provided a voltage dividing network which is traced from terminal 260 through audio frequency choke coil 115 and resistor 117 to terminal 270. Current flowing through the network causes a voltage drop across resistor 117 for maintaining the bases and collectors of transistors 103 and 110 negative with respect to the emitters.

In order to transmit speech signals from the telephone to the line 310, modulator 100 including a dynamic type transmitter 101 is provided to modulate the output voltage of a conventional radio frequency oscillator. The oscillator includes PNP type transistor 103. As previously noted, base **103*b* and collector 103*c* of the transistor are maintained negative with respect to emitter 103*a*. This voltage difference is sufficient to cause current to be conducted from the emitter to the collector and the oscillator tank circuit comprising capacitors 106 and 107 and coil 120. Voltage induced in the feedback circuit comprising tickler coil 105, by changes in current flow through coil 120, is coupled across emitter 103*a* and base 103*b* through capacitors 102 and 104; the feedback voltage is in such amplitude and phase relation to the voltage across the tank circuit that constant frequency oscillating operation of transistor 103 is maintained. The audio frequency voltage generated by speaking into transmitter 101 is impressed on capacitor 102 of the feedback circuit and is therefore effective for causing variation in the feedback voltage across emitter 103*a* and base 103*b***. The variation in feedback voltage is effective for modulating the amplitude of the output voltage of the oscillator. It has been observed that oscillator frequencies of the order of 100 kc. are practical for use in my invention, and that best results are achieved when 100 percent modulation of the radio frequency voltage is obtained.

The modulated output of the oscillator is coupled to a class A amplifier including PNP type transistor 110. As previously observed, base **110*b* is maintained negative with respect to emitter 110*a*. As in the case of transistor 103, the voltage across the emitter and collector is sufficient to cause current to flow from the emitter through the collector, resistor 112, and the left-hand winding of transformer 113**. The output voltage of the oscillator, impressed across the input side of the amplifier at resistor 108, is effective to drive transistor 110, so that amplified, modulated oscillator voltage is applied to the left-hand winding of transformer 113. Voltage induced in the right-hand winding of transformer 113 is applied through capacitor 118 to wire pair B, which, in turn, is coupled to line 310 in a manner to be described presently.

The telephone also includes receiving means such as electro-acoustical transducer 200 for receiving audio frequency signals incoming to the telephone from line 310. Transducer 200 is connected by wire pair C in parallel with wire pair B and the output side of modulator 100. The parallel connected modulator 100 and transducer 200 are coupled to line 310 at terminals 260 and 270 by means including a first diode 230, radio frequency choke 242, and blocking capacitor 250. Diode 230 is effective as a first demodulator for demodulating the positive half cycles of the output signal from modulator 100. With this arrangement, the demodulated signals are applied to line 310, while choke coil 242 is effective for preventing radio frequency signals from the output signal of modulator 100 from being applied to the line. In order to further insure against the application of radio frequency signals to line 310, capacitor 240, bridged between the output side of diode 230 and terminal 270, effectively shorts out radio frequency signals; the value of the capacitor is such that it offers a high impedance path to audio frequency signals, thereby maintaining the transmitting and receiving efficiency of the telephone subset.

In order to prevent audio frequency voltages applied to line 310 in the above manner from affecting transducer 200, I provide a balancing means including impedance 222. Impedance 222 is substantially equal to impedance 300. Means including diode 220 is provided for coupling the balancing means across pairs B and C (and, therefore, modulator 100 and transducer 200). Diode 220 is poled so that it is effective for demodulating the negative half cycles of the modulator 100 output signal. Owing to the equality between the impedances of the balancing network and the line, equal and opposite audio frequency voltages derived from the demodulated positive and negative half cycles of the radio frequency signals generated within modulator 100 are placed across pair C and transducer 200 so that the net audio frequency voltage originating at output of modulator 100 is substantially zero.

Audio frequency signals transmitted from the distant end signal source over the line 310 and which are incoming to transducer or receiver 200 are rectified at diode 230 so that only half the audio frequency energy transmitted to the telephone set is received at transducer 200. In order to help maintain the receiving efficiency of the telephone, diode 220 is poled so that the rectified incoming signals applied to pairs B and C from line 310 are not conducted by the balancing network 221 and 222. Further, the right-hand winding of coil 113 and series capacitor 118 offer sufficiently high impedance to the rectified audio frequency signals to prevent a substantial receiving loss through the output section of modulator 100.

With this arrangement for receiving and transmitting audio frequency signals at transducer 200 and from modulator 100, respectively, it is possible to provide a system in which the combined transmission and receiving loss of the telephone set may approach 3 db minimum, and where the loss is introduced only in the transmitting function, as contrasted to a conventional telephone set using a hybrid coil, where the transmission and receiving loss cannot be expected to be better than 6 db.

Figure 3:
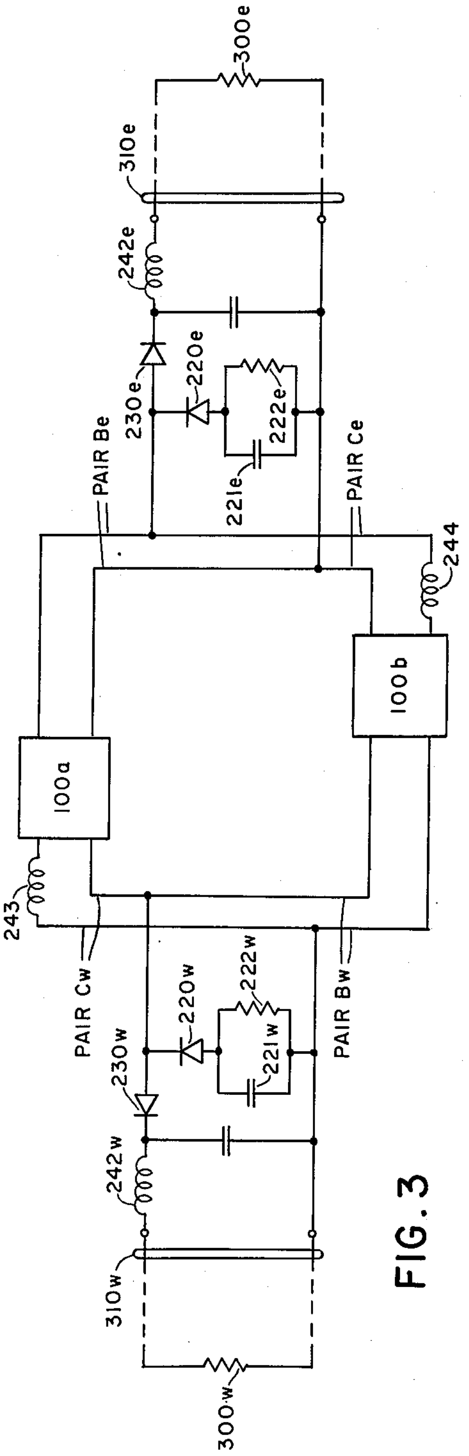

Another embodiment of my invention is a two-way voice-frequency repeater such as the one shown in block diagram form in FIG. 3. In FIG. 3, the input side of each of a pair of modulators, 100*a* and 100*b*, is connected to one of lines 310*w* and 310*e*, respectively, by a corresponding one of wire pairs C*w* and C*e*. Each of modulators 100*a* and 100*b* includes an oscillator and amplifier substantially identical to the ones in the above-described telephone set. Audio frequency signals incoming from one of the lines impressed on the input side of the corresponding modulator is effective for modulating the output voltage of that modulator in substantially the same way that the output voltage of transmitter 101 in the above described telephone set is used within modulator 100. The output signals from modulators 100*a* and 100*b* are applied to pairs B*e* and B*w*, respectively, which are connected in parallel to the input conductors C*e* and C*w*. In order to prevent radio frequency signals from the output of a modulator from being imposed on the input side of the opposite modulator, radio frequency chokes 243 and 244 are placed in series with pairs C*w* and C*e*, respectively.

Parallel connected pairs B*e*—C*e* and B*w*—C*w* are coupled to lines 310*e* and 310*w* by means including diodes 230*e* and 230*w*, respectively. Each diode is effective for demodulating half cycles of the output signal of the corresponding one of modulators 100*a* and 100*b* so that an amplified signal originating on line 310*e* is repeated to line 310*w* and vice versa. Choke coils 242*e* and 242*w* serve to prevent the application of radio frequency signals to the line in the same manner as choke coil 242, used in the above described telephone set.

In order to prevent audio frequency signals originating at one of the modulators from interfering with the parallel connected audio frequency input of the opposite modulator, I have provided first and second balancing networks including impedances 221*e*—222*e* and 221*w*—222*w*, respectively. Means including diodes 220*e* and 220*w* are used for connecting the first and second balancing networks in parallel with the audio frequency inputs of modulators 100*b* and 100*a*, respectively. Diodes 220*e* and 220*w* are effective for demodulating the other half cycles of the radio frequency signals put out by the modulators 100*a* and 100*b*, respectively; these diodes correspond in function to diode 220 in the above described telephone set. Thus, each balancing network impedance substantially equals the impedance of the corresponding one of lines 300*e* and 300*w*, so that equal and opposite audio frequency voltages derived from radio frequency signals originating at one of the modulators are applied to the audio frequency-responsive input of the opposite modulator.

While I have shown and described specific embodiments of my invention, other modifications will readily occur to those skilled in the art. I do not, therefore, desire my invention to be limited to the specific arrangement shown and described, and I intend in the appended claims to cover all modifications within the spirit and scope of my invention.

What is claimed is:

1. In a telephone set circuit, means for receiving alternating current signals, a source of modulated alternating current signals coupled in parallel with said means for receiving alternating current signals, a first half wave demodulating means, means for applying said modulated alternating current signals as an input to said first demodulating means, a line connecting said telephone set to a central office, means for applying the output of said first demodulating means to said line, whereby said line forms part of the load impedance of said first demodulating means, a second half wave demodulating means oppositely poled with respect to said first demodulating means, means for applying said modulated alternating signals as an input to said second demodulating means, said second demodulating means including a load impedance substantially equal to the load impedance of said first demodulating means.

2. The combination as set forth in claim 1 wherein an independent source of alternating current signals is coupled to the central office end of said line for transmitting signals from said independent source to said means for receiving alternating current signals.

3. The combination as set forth in claim 1 wherein said demodulating means comprise diode devices.

4. The combination as set forth in claim 3 wherein said source of modulated alternating current signals comprise an audio frequency transmitter and a radio frequency oscillator modulated by said transmitter.

5. The combination as set forth in claim 4 wherein the means for applying the output of said first demodulating means to said line includes a radio frequency choke for preventing the application of radio frequency signals to said line.

References Cited in the file of this patent

UNITED STATES PATENTS 2,496,266 Brode et al. ............ Feb. 7, 1950

2,580,421 Guanella ............ Jan. 1, 1952
2,629,783 Hopkins ............ Feb. 24, 1953
2,691,073 Lowman ............ Oct. 5, 1954
2,725,532 Radcliffe ............ Nov. 29, 1955
2,732,436 Aikens et al. ............ Jan. 24, 1956
2,759,179 Kircher ............ Aug. 14, 1956
2,762,867 Meacham ............ Sept. 11, 1956
2,801,288 Meacham ............ July 30, 1957
2,801,289 Pye ............ July 30, 1957
2,808,462 Meacham ............ Oct. 1, 1957
2,818,470 Busala et al. ............ Dec. 31, 1957
2,824,175 Meacham et al. ............ Feb. 18, 1958

FOREIGN PATENTS 1,119,253 France ............ Apr. 3, 1956